3,317,697
HERMETICALLY SEALED SWITCH AND PROTECTIVE MOUNTING MEANS THEREFOR
Werner Robert Bauer, Columbus, Ohio, assignor to Robertshaw Controls Company, Richmond, Va., a corporation of Delaware
Filed Oct. 5, 1965, Ser. No. 493,108
8 Claims. (Cl. 200—168)

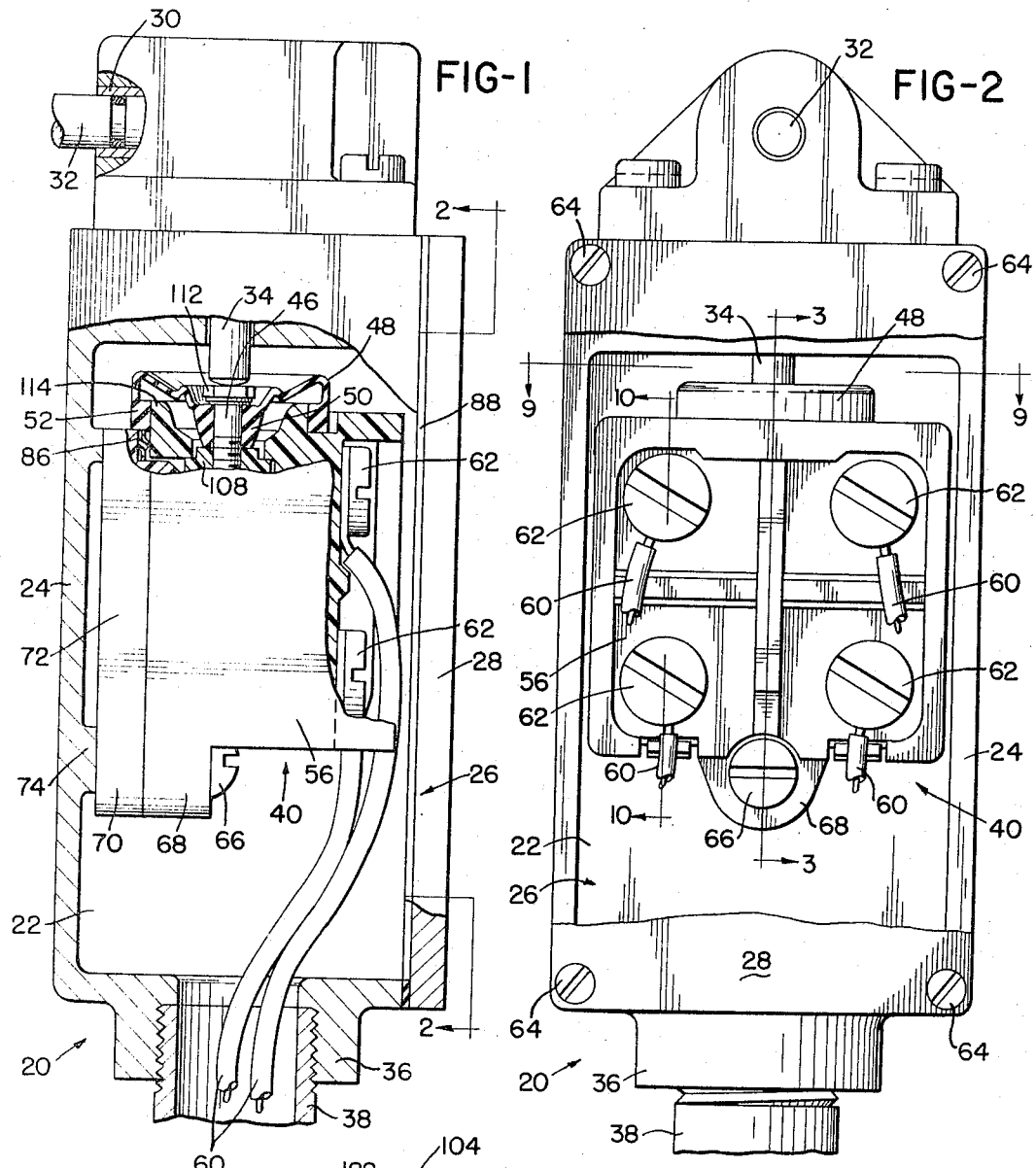

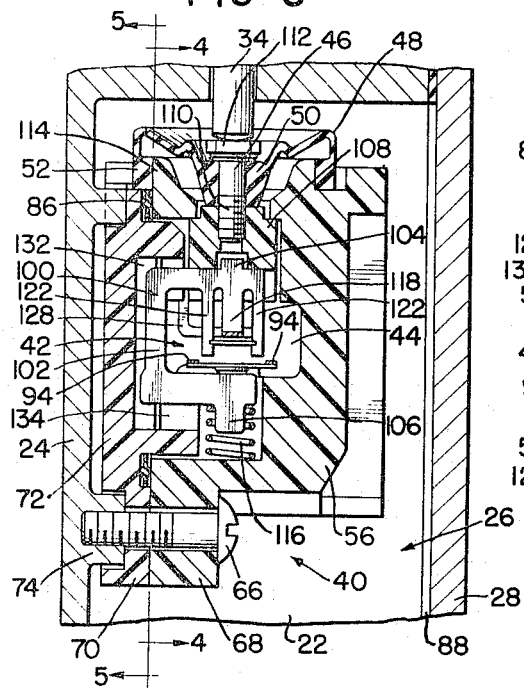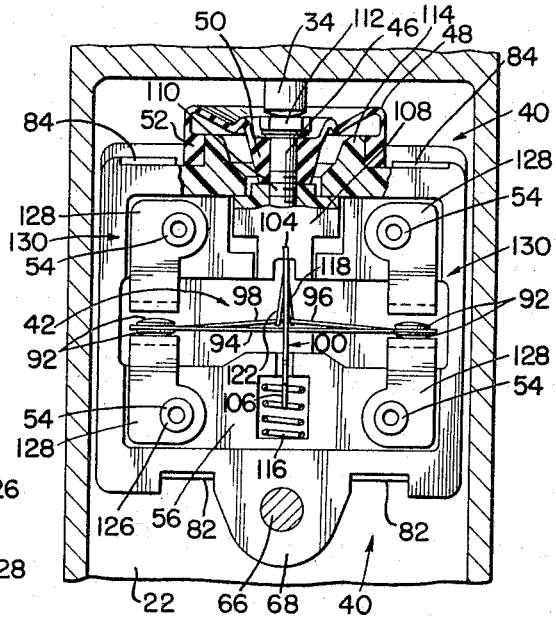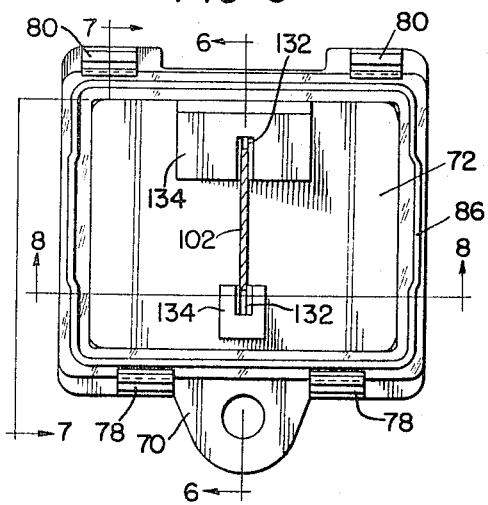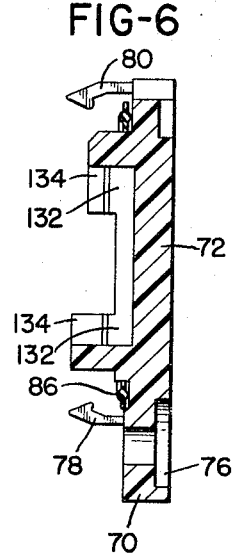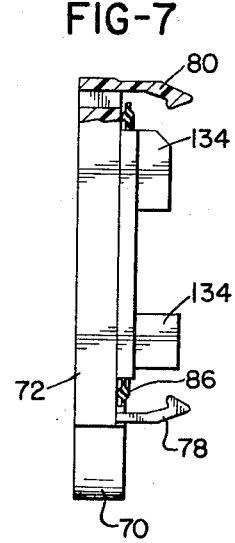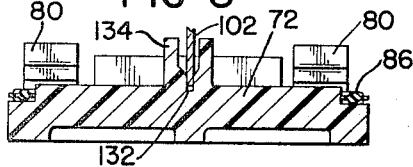
INVENTOR.
WERNER ROBERT BAUER
HIS ATTORNEYS May 2, 1967
W. R. BAUER
3,317,697
HERMETICALLY SEALED SWITCH AND PROTECTIVE
MOUNTING MEANS THEREFOR
Filed Oct. 5, 1965
3 Sheets-Sheet 3
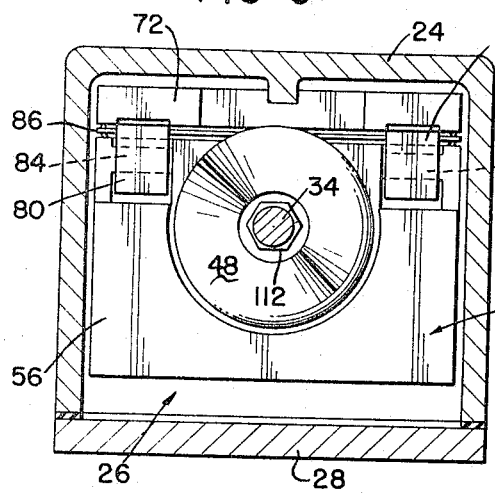
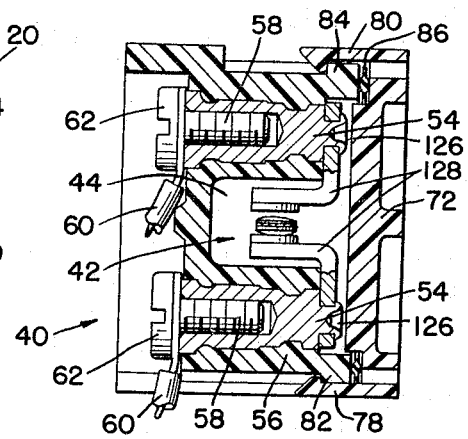
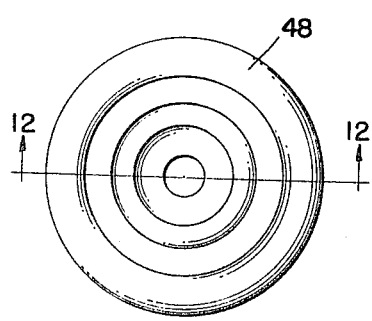
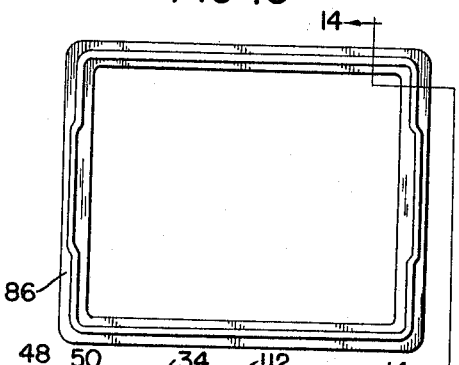
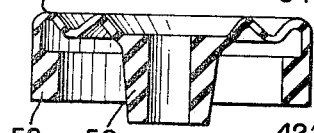
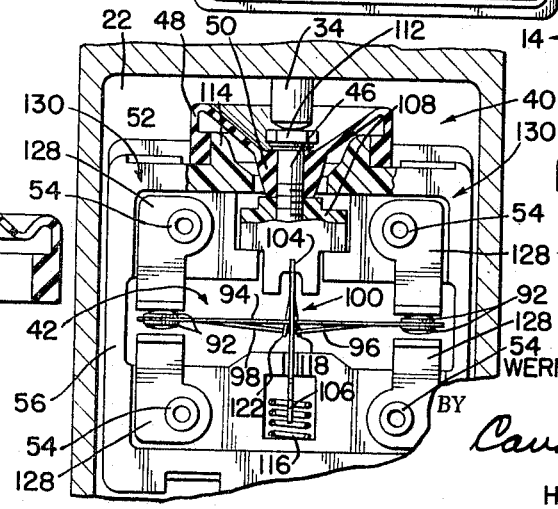
INVENTOR.
WERNER ROBERT BAUER
BY
Cauder & Cauder
HIS ATTORNEYS United States Patent Office 3,317,697
Patented May 2, 1967

This invention relates to a sealed limit switch and the like.

A sealed switch according to this invention may be placed in an outer casing with an outer casing enclosure and a removable outer casing cover for access into the enclosure. The outer casing may have passageway means to receive a switch operator means extending into the outer casing enclosure for operating a switch actuator on a switch casing in the enclosure. The outer casing may have electrical conduit attachment means for connection of electrical conductor means or wires passing through the conduit into the enclosure to be connected to electrical terminal means on the switch casing. A hermetically sealed switch casing may be provided in the outer casing enclosure, such switch casing having a main body and a switch casing cover plate secured and sealed to such main body.

The sealed switch casing is so constructed that it is readily accessible when the outer casing cover is removed. The electric wires may be properly connected to the connector terminals. Such connector terminals or screws may be readily operated when the outer cover is removed. The entire switch casing may be removed from the outer casing.

The switch casing may include a main body within which the switch cavity may be located. A switch casing cover may also be provided. Such switch casing main body may have the electrical connector means or screws which are accessible when the outer casing cover is removed.

The switch casing main body and switch casing cover may be readily secured together or separated. A seal means is readily located between the main body and cover of the switch casing.

The switch in the switch cavity is protected from vapors and the like that may enter through the wire conduit. The vapors might condense in the outer casing enclosure, and produce cutting liquids, such as refined light petroleum distillates. However, these liquids will not pass through switch casing, or any porous bearing bushing and the like to reach the switch in the switch cavity.

The switch casing is also made to have a small volume which considerably decreases the pumping effect that might otherwise be produced.

Other features are apparent from this description, the appended claimed subject matter and/or the accompanying drawings, in which:

FIGURE 1 is a vertical view, partly in elevation and partly in cross-section of a basic switch encased in a housing with the electric lines passing through a conduit.

FIGURE 2 is a side view of FIGURE 1, with parts broken away and taken from the line 2—2 of FIGURE 1.

FIGURE 3 is a cross section taken along the line 3—3 of FIGURE 2.

FIGURE 4 is a cross-section taken along the line 4—4 of FIGURE 3.

FIGURE 5 is a view taken along the line 5—5 of FIGURE 3.

FIGURE 6 is a cross-section taken along the line 6—6 of FIGURE 5.

FIGURE 7 is a view taken along the line 7—7 of FIGURE 5.

FIGURE 8 is a cross-section taken along the line 8—8 of FIGURE 5.

FIGURE 9 is a cross-section taken along the line 9—9 of FIGURE 2.

FIGURE 10 is a cross-section taken along the line 10—10 of FIGURE 2.

FIGURE 11 is a top view of the sealing boot for the plunger which actuates the switch parts.

FIGURE 12 is a cross-section along the line 12—12 of FIGURE 11.

FIGURE 13 is a side view of the seal between the switch cover plate and switch casing main body.

FIGURE 14 is a view along line 14—14 of FIGURE 13.

FIGURE 15 is a view similar to FIGURE 4 with the switch plunger actuated downwardly.

FIGURE 16 is a perspective view of the switch blade construction and blade actuating frame.

Certain words indicating direction, relative position, and the like may be used in this specification and in the claimed subject matter for the sake of brevity and clearness. However, it is to be understood that such words are used only in connection with the illustration in the drawings, and that in actual use the parts so described may have entirely different direction, relative to position and the like. Examples of such words may be "vertical," "horizontal," "upper," "lower," etc.

An outer casing 20 may be constructed to have an outer casing enclosure 22.

The outer casing 20 may include an outer casing wall structure 24 with an access opening 26. The outer casing 20 may also include a removable cover 28 for access into the enclosure 22.

Passageway means 30 may be provided in the casing 20 to receive a switch operator 32 which may extend into the enclosure 22, as by a reciprocable rod 34, the reciprocation of which operates the switch to be described.

Electrical conduit attachment means 36 may be provided on the outer casing 20 for connection of an electrical conduit means 38, which may be connected with the enclosure 22.

An inner sealed switch casing 40 may be secured to such outer casing 20.

A switch 42 may be supported in a hermetically sealed switch cavity 44.

Switch actuating means 46 may be connected to the switch 42 and may extend out of the switch casing 40 into the enclosure 22 to be operated by the switch operator reciprocating rod 34.

Sealing means 48 may be connected to the switch actuating means 46 and to the switch casing 40, to seal the actuator 46 and prevent any gaseous or liquid travel between the switch cavity 44, and the outer casing enclosure 22. The sealing means 48 may be in the form of a flexible diaphragm, or cup like member, which has its inner hub 50 connected to the switch actuating means 46, and has its outer rim 52 secured to the switch casing 40.

The seal 48 may be made of any suitable natural or synthetic rubber or rubber like material, such as Buna N. Many other seal materials are well-known in the seal industry.

Electrical terminal means 54 may be connected to the switch 42. Such means 54 may pass through and be sealed to the switch casing 40, as shown in FIGURE 10, wherein the metallic terminal means 54 is embedded in the insulative molded plastic main body of switch casing 40.

The electrical terminal means 54 may have manipulatable electrical connecting means or connector screws 58 for attachment to electrical conductor means or wires 60.

The wires 60 may be secured in place by means of the heads 62 of the screws 58. The conductors or wires 60 may be introduced into the enclosure 22 through the conduit means 38.

The electrical connecting means, including the screw heads 62, are accessible and manipulatable through the access opening 26, for attachment or detachment of the electrical conductor means or wires 60, when the cover 28 is removed by the unscrewing of attaching screws 64 for the cover 28.

The switch casing 40 is supported inside the outer casing 20 by attachment to the side wall 24. Such attachment may be accomplished by the screw 66, which passes through the flange 68 of the main body 56 of the casing 40. The screw 66 may also pass through the flange 70 of the cover plate 72 of the switch casing 40. The screw 66 may extend into a lug 74, which may be formed in the wall 24 of the outer casing 20, by a suitable recess 76 in the plate 72.

Thus, the entire switch casing may be readily secured by a side wall structure of the outer casing and may be readily secured in or removed from the enclosure 22 through the access opening 26.

The main body 56 of the switch casing 40, and the cover plate 72 of the switch casing 40 may be hermetically sealed together as shown in FIGURES 5, 6, 7, and 10. The cover plate 72, FIGURES 6 and 7, may be provided with flexible fingers or hooks 78 and 80, which may be integrally molded to the cover plate 72. These flexible fingers 78 and 80 are inwardly biased, as shown in FIGURES 6 and 7, and may be hooked or snapped over suitable ridges 82 and 84, FIGURE 10, of the main body 56 of the switch casing 40. Such fingers 78 and 80 may be pried outwardly to open the switch casing, if desired.

A flexible seal member 86 may be interposed between the main body 56 and the cover plate 72 of the switch casing, as shown in FIGURE 10. The flexible seal member 86 is shown in detail in FIGURES 13 and 14. This flexible member may be made of any suitable resilient seal material, which may be rubber or rubber-like, or synthetic rubber, such as neoprene or many materials well known in the seal art. The dimensions of the ridges 82 and 84, and of the hooks 78 and 80 are such, that when the hooking action has taken place, as shown in FIGURE 10, a hermetic seal is provided between the main body 56 and the cover 72, to prevent any substantial travel of gas between the switch cavity 44 and the outer casing enclosure 22.

The main body 56, and the cover 72 may be made of any suitable moldable plastic material, well known in the molding art, and which material also has electrical insulative properties, as is well known. Any well known general purpose phenolic compound or acetal resin compound may be used, by way of example, as is well known to the molding industry.

From the foregoing, it is to be seen that the switch casing 40 is hermetically sealed by the flexible seal 86, wheer the main body 56, and the cover plates 72 are joined together. The switch casing 40 is also hermetically sealed, where the switch actuating means 46 passes through the main body 56, by means of the flexible sealing means 48. The switch casing 40 is also hermetically sealed, where the electrical terminal means 54, FIGURE 10, are tightly molded within the main body 56 of the switch casing 40. The metallic conductors 54 are so shaped that a substantially hermetic sealing action is produced between the metallic conductors 54, and the molded material of the main body 56 of the casing 40. No gas or liquid can travel between the joint of the terminals 54, and the casing 56, and no gas or liquid can travel along the conductor attaching screw 58, as is readily seen in FIGURE 10.

Therefore, no gas or liquid travel can take place between the outer casing enclosure 22, and the switch cavity 44, since all of the possible avenues of gas and liquid travel have been hermetically sealed, as above described.

A suitable seal 88 may be provided between the cover 28 and the main body or side wall 24 of the outer casing 20. The purpose of such seal 88 is to prevent any obnoxious gases which may be introduced into the enclosure 22 from passing out between the cover 28 and the casing main wall 24. A suitable seal may also be provided between the switch operator 32 and passageway means 30, FIGURE 1, as shown.

Any suitable type of switch may be provided in the switch cavity 44. Merely by way of example, the switch illustrated herein may be used.

As shown in FIGURE 16, a switch blade construction 90 may be provided and may include end movable contacts 92, which may be joined together by the outer blade connectors 94. The blade ends or contacts 92 may also be provided with snap tongues 96 and 98, which are biased upwardly, as shown in FIGURE 16. A vertically movable frame 100 may have a C-shaped portion 102, which straddles the snap blade 90, and has an upper extension 104 and a lower extension 106.

The upper extension 104 engages a sleeve 108, FIGURE 3, which is internally threaded, and engages the threads 110 of the actuator screw 46. The sleeve 108 has been tightly threaded into the actuator 46, tightly to hold and seal the hub 50, FIGURES 1, 3 and 4 between the screw head 112, FIGURES 1 and 3 and the upper part of the sleeve 108. This causes the rim 50 of a seal 48 to be tightly secured and hermetically sealed to the actuator 46. The outer rim 52 is made with a sufficiently small diameter, that it is tightly secured to an upper circular flange 114 of the main body 56, to provide a hermetic seal at the rim 52.

Vertical reciprocation of the actuator 46 therefore will vertically actuate the C frame 102, which is upwardly biased by the spring 116, which surrounds the lower extension 106 of the C shaped frame member 102. The spring 116, being a compression spring, will return the C shaped frame 102 to its upper position, whenever the reciprocating rod or operator 34 is moved upwardly, as shown in FIGURE 4. When the reciprocating rod 34 is moved downwardly, by the operator 32, then the C shaped frame 102 is pushed down, as shown in FIGURE 15.

The C-shaped member 102, FIGURE 16, has a downwardly biased relatively stiff blade or tongue 118, which has a well known notch engagement at 120 with the tongue 96. The C shaped frame 102 also has two relatively rigid tongues 122, which have notch engagements with the corners of the tongue 98, as can be seen in FIGURE 16. The tongues 118, and 122, can yield a slight amount, but they are relatively more rigid than the tongues 96 and 98.

From FIGURE 16 it can be seen that the tongues 118 and 122 produce a tension on the connecting members 94 of the blade 90. When the C shaped member 102 is moved downwardly from the position shown in FIGURE 16 a sufficient amount, the notch engagement 120 passes downwardly past the tension blade connectors 94. The blade ends or contacts 92, of the blade 90 are snapped upwardly to the positions shown in FIGURE 15, whereas, when the condition of FIGURE 16 prevails, the blade ends are downwardly, as shown in FIGURE 4.

The terminal means 54 may be connected or riveted at 126, FIGURE 10, to the stationary contact arms 128, to provide the stationary contacts 130, between which the movable contacts 92 reciprocate, as shown between FIGURES 4 and 15.

The C-shaped member 102 may be guided in the grooves 132, FIGURE 5, by the inward arms 134 of the cover member 72, FIGURE 3. This maintains the C-shaped member 102 in proper vertical alignment.

While a specific snap acting switch has been shown in the cavity 44, it is to be understood that any other well known snap acting switch construction may be used in the cavity 44, and may be reciprocated by the actuating means 46, as is obvious to anyone skilled in the art.

It is thus to be seen that a new, unobvious and useful sealed switch construction has been provided, wherein the switch parts are not susceptible of being harmed by any gas or liquid in the outer casing enclosure 22.

Long duration of the parts is therefore insured and a more efficient operation is provided.

While the form of the invention now preferred has been disclosed as required by statute, other forms may be used, all coming within the scope of the claimed subject matter which follows.

What is claimed is:

1. In combination:
an outer casing providing an outer casing enclosure for a switch casing and having a wall structure with an outer casing access opening;
a removable cover for said access opening;
passageway means in said wall structure to receive a switch operator extending into said enclosure;
attachment means on said wall structure for attachment of electrical conduit means to be connected with said casing enclosure, the interior of said conduit means to be connected to said outer casing enclosure,
an inner sealed switch casing made of electrically insulative moldable material and secured to said wall structure, said switch casing having a switch cavity sealed from said outer casing enclosure;
a switch in said switch cavity;
switch actuating means connected to said switch, extending out of said switch casing into said outer casing enclosure and operated by said switch operator;
flexible sealing means connected to said switch actuating means and to said switch casing to seal said switch cavity from said outer casing enclosure;
electrical terminal means with internal threads and connected to said switch, passing through, tightly molded within and sealed to said switch casing; and electrical wire connector screws threadedly engaged in said threads and having wire retaining heads in said enclosure for attachment of electrical conductor wires to said terminal means, said wires to be introduced into said casing enclosure through said electrical conduit means, said wire retaining heads being accessible through said access opening for attachment of said conductor wires to said terminal means.

2. In combination:
an outer casing providing an outer casing enclosure, said casing including an outer casing wall structure with an access opening and including a removable cover for access into said enclosure;
passageway means in said casing to receive a switch operator extending into said enclosure;
electrical conduit attachment means on said casing to receive and connect electrical conduit means with said enclosure and with the interior of said conduit means connected to said enclosure;
an inner sealed switch casing secured to said outer casing said switch casing having a switch cavity sealed from said outer casing enclosure;
a switch in said switch cavity;
switch actuating means connected to said switch, extending out of said switch casing into said enclosure and operated by said switch operator;
sealing means connected to said switch actuating means and to said switch casing to seal said switch cavity from said outer casing enclosure;
electrical terminal means connected to said switch, passing through and sealed to said switch casing, and having manipulatable electrical connecting means in said enclosure and outside said switch casing for attachment of electrical conductor means introduced into said enclosure through said conduit means, said electrical connecting means being manipulatable through said access opening for said attachment.

3. In combination:
a hermetically sealed switch casing made of electrically insulative moldable material and providing a hermetically sealed switch cavity and including a switch casing main body and a switch casing cover plate secured and sealed to said main body;
a switch in said cavity;
a switch actuator actuating said switch in said cavity and passing through said casing to the exterior of said casing;
a hermetic sealing means to seal said actuator to said casing;
electrical terminal means connected to said switch, passing through, embedded in and sealed to said switch casing, and having manipulatable electrical connecting means outside said switch casing for attachment to electrical conductor means outside said switch casing;
an outer casing in which said hermetically sealed switch casing is supported, said outer casing providing an outer casing enclosure in which said hermetically sealed switch casing is enclosed, said outer casing including an outer casing wall structure with an access opening and including a removable cover for access into said enclosure and through which access opening said electrical connecting means are manipulatable; and electrical conduit attachment means on said outer casing for connection of electrical conduit means with said outer casing enclosure and for the connection of electrical conductor means passing from said conduit means to said electrical terminal means, said terminal means being accessible and manipulatable through said access opening.

4. A combination according to claim 3 in which said main body has rectangularly arranged side walls, a rectangularly arranged end wall, said side walls providing an open rectangular cavity rim, and said cover plate being rectangular and being releasably secured and sealed against said rectangular rim.

5. A combination according to claim 4 in which said cover plate has inwardly biased finger hook means engaging said main body.

6. A combination according to claim 3 in which said manipulatable connecting means are screws threadedly engaged in sealed threaded openings in said terminal means, said screws having screw heads for retaining said electrical conductors.

7. A combination according to claim 4 in which said switch casing cover plate is secured against a wall of said outer casing.

8. A combination according to claim 4 in which a supporting screw passes through said switch casing main body and said switch casing cover plate and has a screw head that is accessible when said outer casing separable means are separated.

References Cited by the Examiner

UNITED STATES PATENTS

| | | | |
|---|---|---|---|
| 2,794,889 | 6/1957 | Bachman et al. | 200—168 |
| 3,105,885 | 10/1963 | Roeser | 200—168 |
| 3,165,574 | 1/1965 | Carling | 200—168 |

ROBERT K. SCHAEFER, *Primary Examiner.*

H. O. JONES, *Assistant Examiner.*